Figure 1:
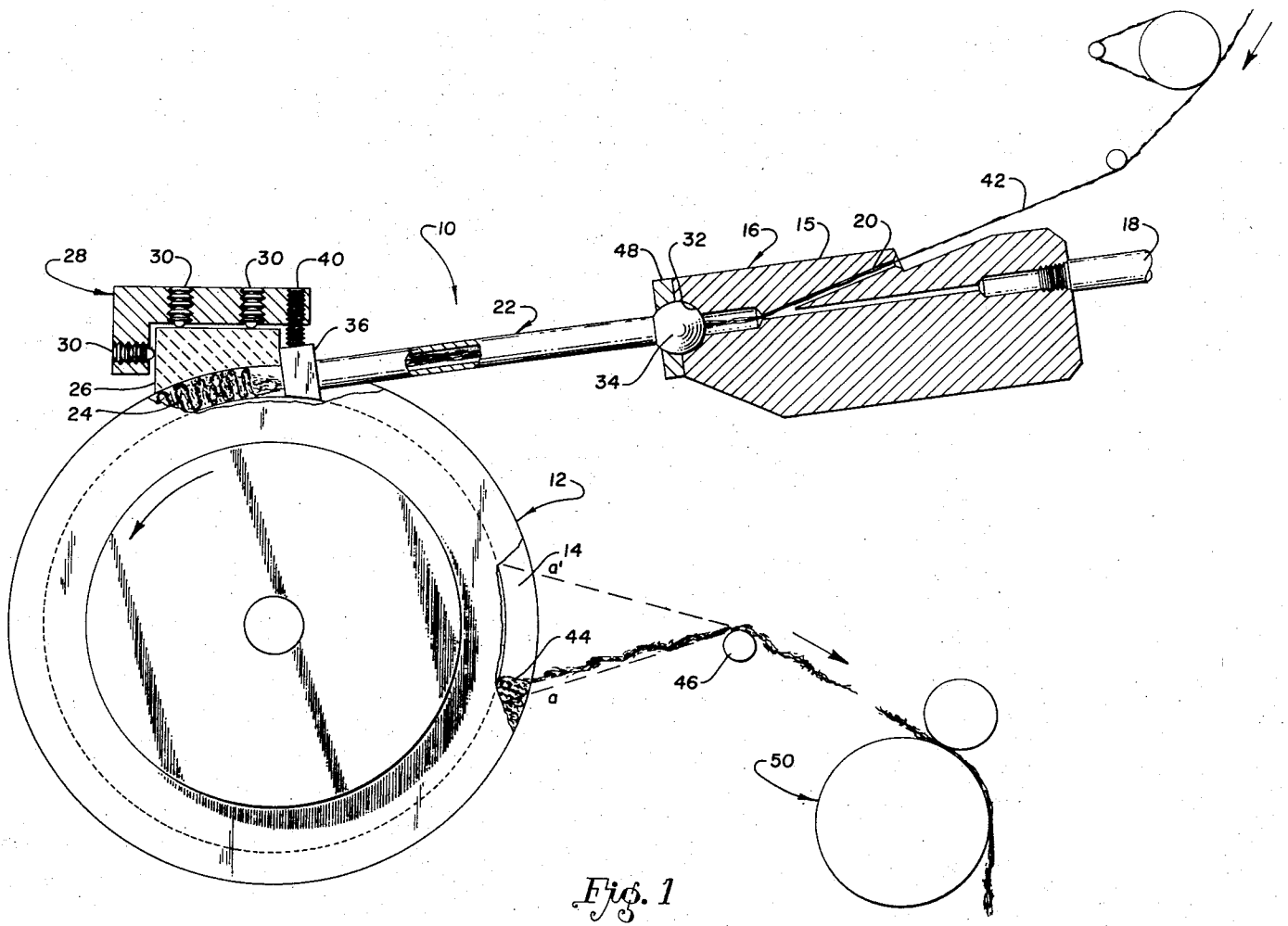
Figure 2:
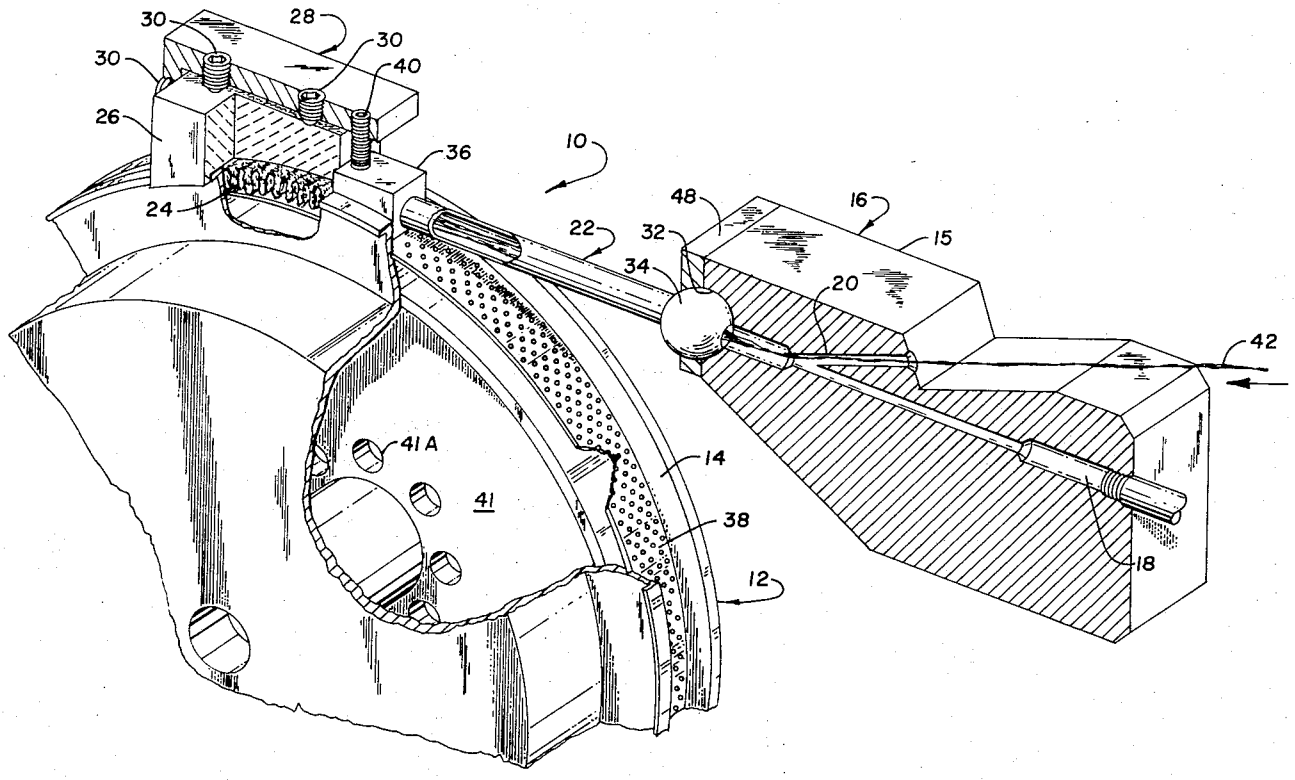
Figure 4:
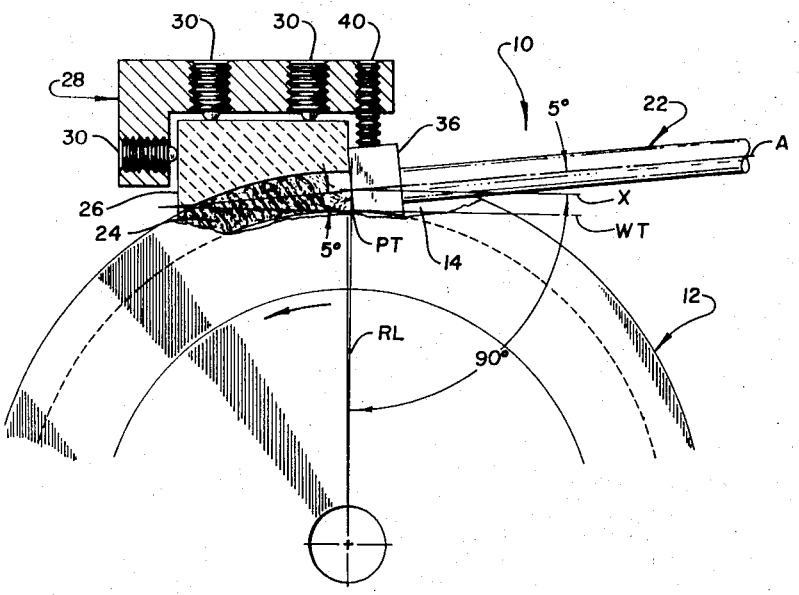
Figure 3:
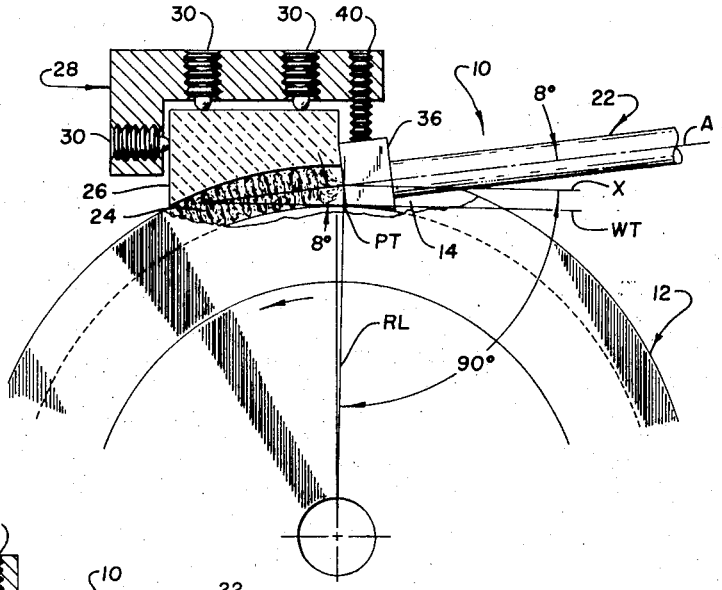
Figure 5:
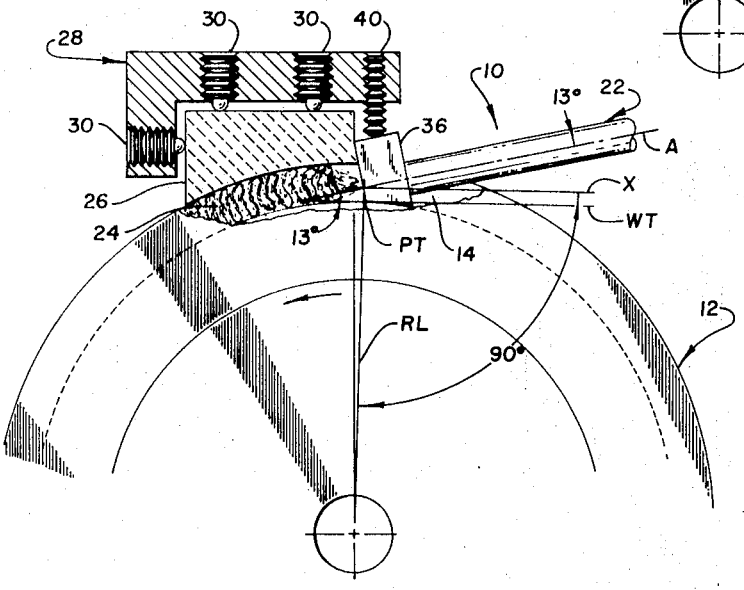

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 6, 1974

925 O.G. 10

T925,009

METHOD AND APPARATUS FOR FORMING THREE-DIMENSIONAL CRIMP IN YARN OF CONTINUOUS LENGTH FILMENTARY THERMOPLASTIC MATERIAL

Wendell G. Faw, 4515 Timberlake Lane 37664, and Robert B. Moore, Jr., 504 Woodmere Drive 37663, both of Kingsport, Tenn.

Continuation of abandoned application Ser. No. 288,827, Sept. 13, 1972. This application Feb. 12, 1974, Ser. No. 441,916

**Int. Cl. D02g *1/12***
U.S. Cl. 28—1.6
3 Sheets Drawing. 18 Pages Specification

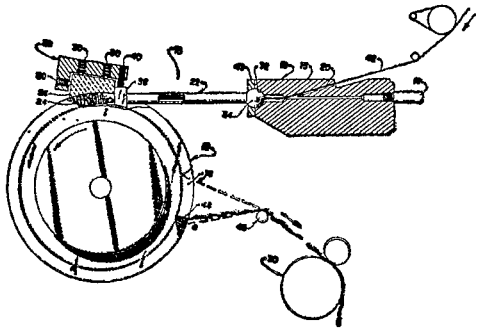

Method and an apparatus for forming three-dimensional crimp of random configuration in a yarn of continuous filaments of man-made material with substantially no S and Z twist or twist reversals in the individual crimped filaments by heating the yarn to a crimp receptive condition by a heated compressible fluid and using the fluid to convey the yarn at high speed into a crimping zone at an angle of about six (6) to twelve (12) degrees above the centerline of the crimping zone; forming a plug of yarn in the crimping zone with the upstream face of the plug being in substantially flat relationship at substantially right angles to the path of linear movement of the plug as it moves through and from the crimping zone; and cooling the yarn plug below the heated crimp receptive condition before removing the yarn from the plug.

METHOD AND APPARATUS FOR FORMING THREE-DIMENSIONAL CRIMP IN YARN OF CONTINUOUS LENGTH FILAMENTARY THERMOPLASTIC MATERIAL

Original Filed Sept. 13, 1972 3 Sheets-Sheet 1

METHOD AND APPARATUS FOR FORMING THREE-DIMENSIONAL CRIMP IN YARN OF CONTINUOUS LENGTH FILAMENTARY THERMOPLASTIC MATERIAL

Original Filed Sept. 13 1972 3 Sheets-Sheet 3